US006554310B2

(12) United States Patent
Babin (10) Patent No.: US 6,554,310 B2
(45) Date of Patent: Apr. 29, 2003

(54) FIFTH WHEEL WITH ROTATABLE BEARING PLATE

(76) Inventor: Pierre Babin, 392 boul. Perron Ouest, Caplan, Quebec (CA), G0C 1H0

( * ) Notice: Subject to any disclaimer, the term of this patent is extended or adjusted under 35 U.S.C. 154(b) by 0 days.

(21) Appl. No.: 09/920,959

(22) Filed: Aug. 3, 2001

(65) Prior Publication Data

US 2003/0025296 A1 Feb. 6, 2003

(51) Int. Cl.$^7$ ................................................ B62D 53/06
(52) U.S. Cl. ......................... 280/441.1; 280/438.1; 280/433
(58) Field of Search ........................ 280/433, 434, 280/438.1, 441.1; 384/421, 422, 591, 593, 594, 595

(56) References Cited

U.S. PATENT DOCUMENTS

| | | | | |
|---|---|---|---|---|
| 2,138,679 A | * | 11/1938 | Sherman | ................... 280/436 |
| 3,430,987 A | * | 3/1969 | Whitmire et al. | ........... 280/404 |
| 3,924,909 A | * | 12/1975 | Kent et al. | .................. 280/433 |
| 4,121,853 A | * | 10/1978 | McKay | ....................... 280/433 |
| 4,307,669 A | * | 12/1981 | Koester et al. | .......... 105/199.4 |
| H45 H | * | 4/1986 | Gilmore | ....................... 30/392 |
| 4,928,987 A | * | 5/1990 | Hunger | ....................... 280/433 |
| 5,066,035 A | * | 11/1991 | Athans et al. | .............. 280/433 |

* cited by examiner

Primary Examiner—Lesley D. Morris
Assistant Examiner—Daniel Yeagley
(74) Attorney, Agent, or Firm—Robert Mitchell; Ogilvy Renault (57) ABSTRACT

A fifth wheel for coupling a tractor to a trailer carrying a kingpin. The fifth wheel comprises a mounting structure adapted to be mounted to the tractor and a fifth wheel plate mounted to the mounting structure and a top bearing surface rotateable relative to the mounting structure about an axis normal to the top bearing surface in order to minimize the friction between the top bearing surface of the fifth wheel plate and the trailer.

21 Claims, 6 Drawing Sheets

FIFTH WHEEL WITH ROTATABLE BEARING PLATE

BACKGROUND OF THE INVENTION

1. Field of the Invention

The present invention relates generally to fifth wheel coupling devices and, more particularly, to a fifth wheel coupling device having a rotatable bearing plate.

2. Description of the Prior Art

Conventional fifth wheel coupling devices generally comprise a wheel plate mounted on the bed of a tractor or towing vehicle and defining a slot for receiving a kingpin extending downwardly from a support plate mounted to a trailer. After insertion, the kingpin is releasably retained in the slot by a suitable locking mechanism.

During coupling operations and under running conditions, the wheel plate and the kingpin support plate provide the sole bearing contact between the tractor and the trailer. The bearing surface of the wheel plate supports the weight of the trailer resting thereagainst it and acts as a surface against which the bearing surface of the kingpin plate rotates during towing operations. Although the so formed load bearing surfaces are relatively large, it has been found that axial friction during coupling, and oscillation and rotation during running result in premature and uneven wear of both load bearing surfaces. This can lead to many problems including, increased tire wear, dangerous steering characteristics as well as structural problems.

The normal practice is to provide a lubricant, such as grease, between these bearing surfaces. However, it has been found that even with lubrication there is still premature wear of the load bearing surfaces. Furthermore, the utilization of grease favors the accumulation of dirt between the top bearing surface of the fifth wheel plate and the opposing undersurface of the kingpin plate. This again results in excessive wear of the opposing bearing surfaces.

Moreover, rocking and turning action between the trailer and the fifth wheel squeezes the grease off the fifth wheel bearing surface and renders the steering progressively more difficult as the friction between the fifth wheel and the trailer increases.

To overcome the above-described problems, it has been proposed to provide a special mounting structure for rotatably mounting the kingpin plate to the chassis of the trailer. However, such structures have not gained overall acceptance since they are relatively complex, expensive and difficult to install.

Furthermore, it has been found that mounting rotatable kingpin plates on trailers is not an economical viable solution in that there are more trailers than there are tractors.

SUMMARY OF THE INVENTION

It is therefore an aim of the present invention to provide a new fifth wheel coupling device wherein friction between bottom and top bearing surfaces of the device is reduced.

It is also an aim of the present invention to provide a new fifth wheel having a rotatable top bearing surface.

It is a further aim of the present invention to avoid the necessity of applying a lubricant between a fifth wheel plate and a kingpin plate.

It is a still further aim of the present invention to minimize wear of a fifth wheel bearing surface.

It is a still further aim of the present invention to reduce the friction between a kingpin and a fifth wheel jaw of a fifth wheel.

It is still a further aim of the present invention to avoid the necessity of externally applying grease or a similar lubricant on a fifth wheel jaw.

It is still a further aim of the present invention, to provide a new fifth wheel having a ramp adapted to support a trailer during coupling and uncoupling operations.

Therefore, in accordance with the present invention, there is provided a fifth wheel for coupling a tractor to a trailer carrying a kingpin. The fifth wheel comprises a mounting structure adapted to be mounted to the tractor, a fifth wheel plate mounted to the mounting structure and having a top bearing surface rotatable relative to the mounting structure about an axis normal to the top bearing surface.

In accordance with a further general aspect of the present invention, there is provided a fifth wheel adapted to be mounted on a tractor for releasable engagement with a kingpin carried by a trailer, comprising a fifth wheel plate having a top bearing surface and defining a fifth wheel opening adapted to captively receive the kingpin, and a ramp adapted to support the trailer during coupling and uncoupling operations, wherein the fifth wheel plate is movable relative to the ramp between a lowered position in which the top bearing surface is located at a substantially lower elevation than the ramp so that the trailer be supported by the ramp and a raised position in which the top bearing surface is located at a higher elevation than the ramp to support the trailer when the kingpin is retained captive in the fifth wheel opening.

In accordance with a further general aspect of the present invention, there is provided a fifth wheel jaw for releasably retaining a kingpin in a fifth wheel opening of a fifth wheel plate. The fifth wheel jaw comprises at least one jaw member displaceable between open and closed positions, at least one roller rotatably mounted to the jaw member and adapted to engage the kingpin, when the jaw member is displaced to its closed position, so as to provide a low friction contact between the fifth wheel jaw and the kingpin.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
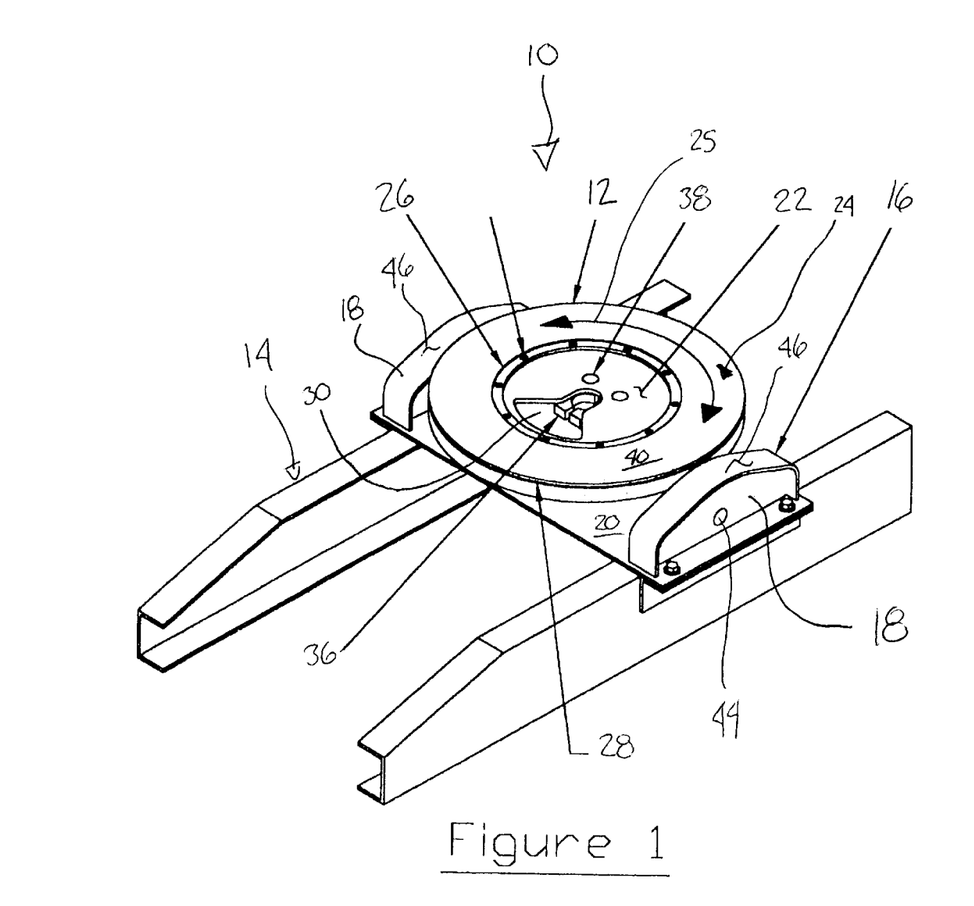
FIG. 1 is a schematic perspective view of a fifth wheel coupling device with a rotatable bearing plate mounted on the bed of a tractor vehicle in accordance with a first embodiment of the present invention.

Now referring to the drawings, and in particular to FIG. 1, a fifth wheel 10 for detachably coupling a trailer or semi-trailer to a highway tractor and embodying the elements of the present invention will be described.

The fifth wheel 10 generally comprises a fifth wheel plate 12 mounted to a bed structure 14 of a tractor by means of a mounting structure 16. The mounting structure 16 includes a pair of laterally spaced-apart mounting members 18 adapted to be fixedly secured to the bed structure 14 by means of bolts or the like. The mounting members 18 are connected together by means of a bottom supporting plate 20 extending transversally therebetween.

The fifth wheel plate 12 includes a base disc 22, an annular bearing plate 24 mounted in opposing relation on the base disc 22, a retaining ring 26 for retaining the annular bearing plate 24 on the base disc 22 while allowing relative rotational movement therebetween (as indicated by arrows 25 in FIG. 1), and an annular antifriction plate 28 between the annular bearing plate 24 and the base disc 22.

The base disc 22 defines a fifth wheel opening 30 for receiving a kingpin 32 (FIG. 2) extending downwardly from an undersurface of a conventional kingpin plate (not shown) securely mounted to a forward end of a trailer 34. The opening 30 has a wide aft end for facilitating engagement of the kingpin 32 in the opening 30 and a narrower slotted forward end for limiting movement of the kingpin 32 relative to the fifth wheel plate 12 during, use. As opposed to conventional fifth wheel slots having a rear open end, the opening 30 is closed at both ends thereof. As will be seen hereinafter, this advantageously allows having a continuous top bearing surface, whereby the bearing surfaces between the trailer 34 and the fifth wheel 10 can be increased.

A set of jaws 36 is provided for positively engaging and retaining the kingpin 32 captive in the forward end of opening 30. The jaws 36 are pivoted at 38 beneath the base disc 22 on opposed sides of the opening 30 and are swingable from and open position to a closed position in relation to the opening 30 so as to engage and releasably retain the kingpin 32 therein. The jaws 36 are operated by a conventional mechanism (not shown).

The retaining ring 26 is preferably bolted to the base disc 22 about the opening 30 and has a radially outwardly extending circumferential flange for overlying an inner circumferential edge portion of the bearing plate 24. By so bolting the retaining ring 26 to the base plate 22, the bearing plate 24 and the antifriction plate 28 can be readily and conveniently removed for services and at times replaced by similar plates if need be.

The antifriction plate 28 is secured to the undersurface of the bearing plate 24 to act as a low friction coefficient lining therefor. The antifriction plate 28 can be integrated to the bearing plate 24 during the molding thereof or, alternatively, it can be adhesively secured to the undersurface of the bearing plate 24. The antifriction plate 28 is made of a low friction coefficient material, such as TEFLON™.

A conventional seal (not shown) can be provided for retaining in place any additional lubricant applied between the bearing plate 24 and they base disc 22.

Figure 4:
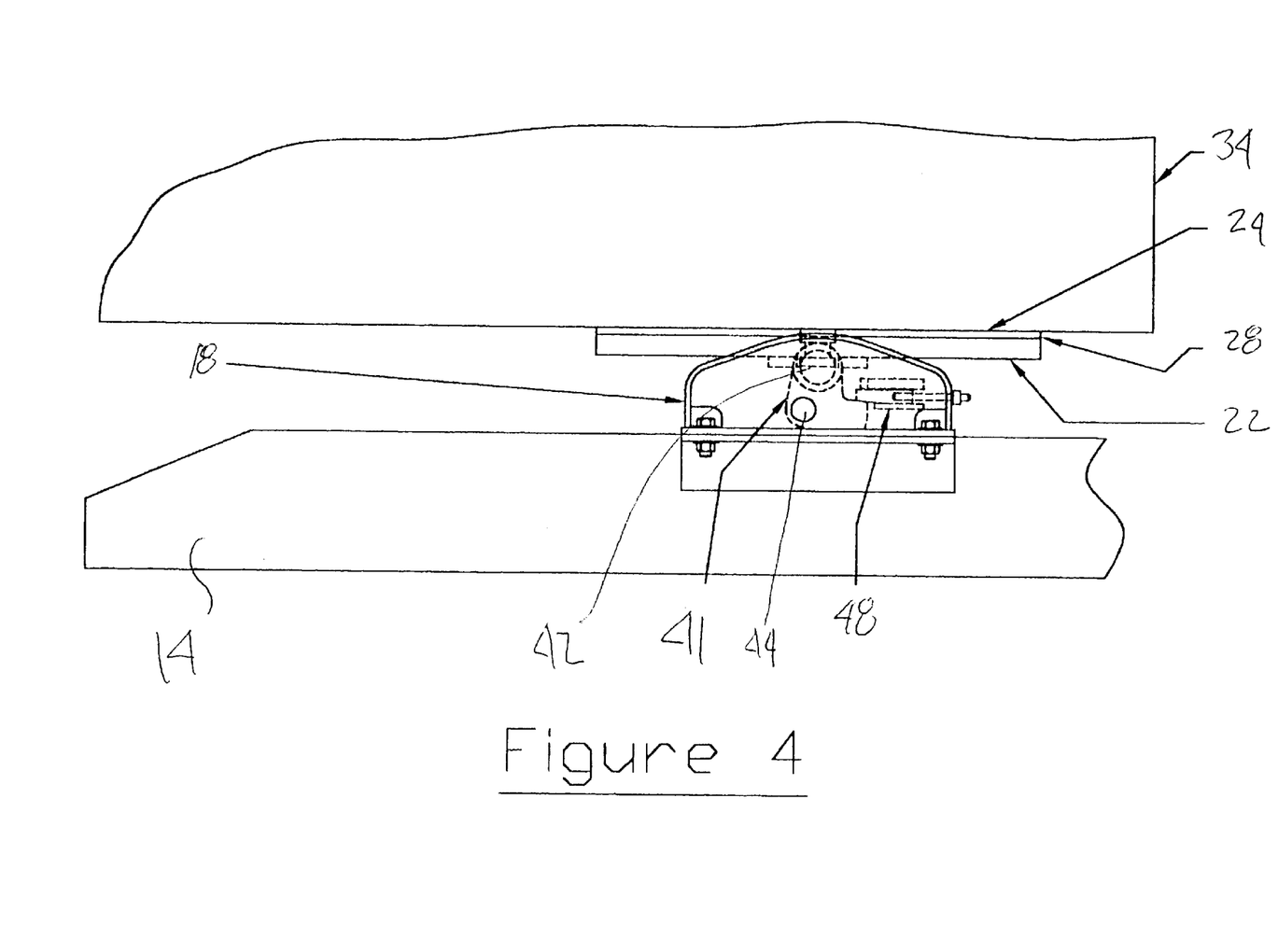
FIG. 4 is a schematic side elevation view of the fifth wheel coupling device shown in its raised operational position.

The bearing plate 24 has a top surface 40 forming the top bearing surface of the fifth wheel plate 12. As illustrated in FIG. 4, the top bearing surface 40 supports the front portion of the trailer 34 with the undersurface of the kingpin plate (not shown) in uniform bearing contact therewith and with the kingpin 32 captively received in the forward end of the opening 30. The rotational capability of the bearing plate 24 avoids the necessity of providing grease or other lubricant between the fifth wheel plate 12 and the kingpin plate since the bearing plate 24 will rotate jointly with the kingpin plate when the tractor turns relative to the trailer 34, thereby virtually eliminating friction between the fifth wheel plate 12 and the kingpin plate. The rotational movement will occur between the bearing plate 24 and the base plate 22, which have an antifriction interface by virtue of the antifriction plate 28.

Figure 2:
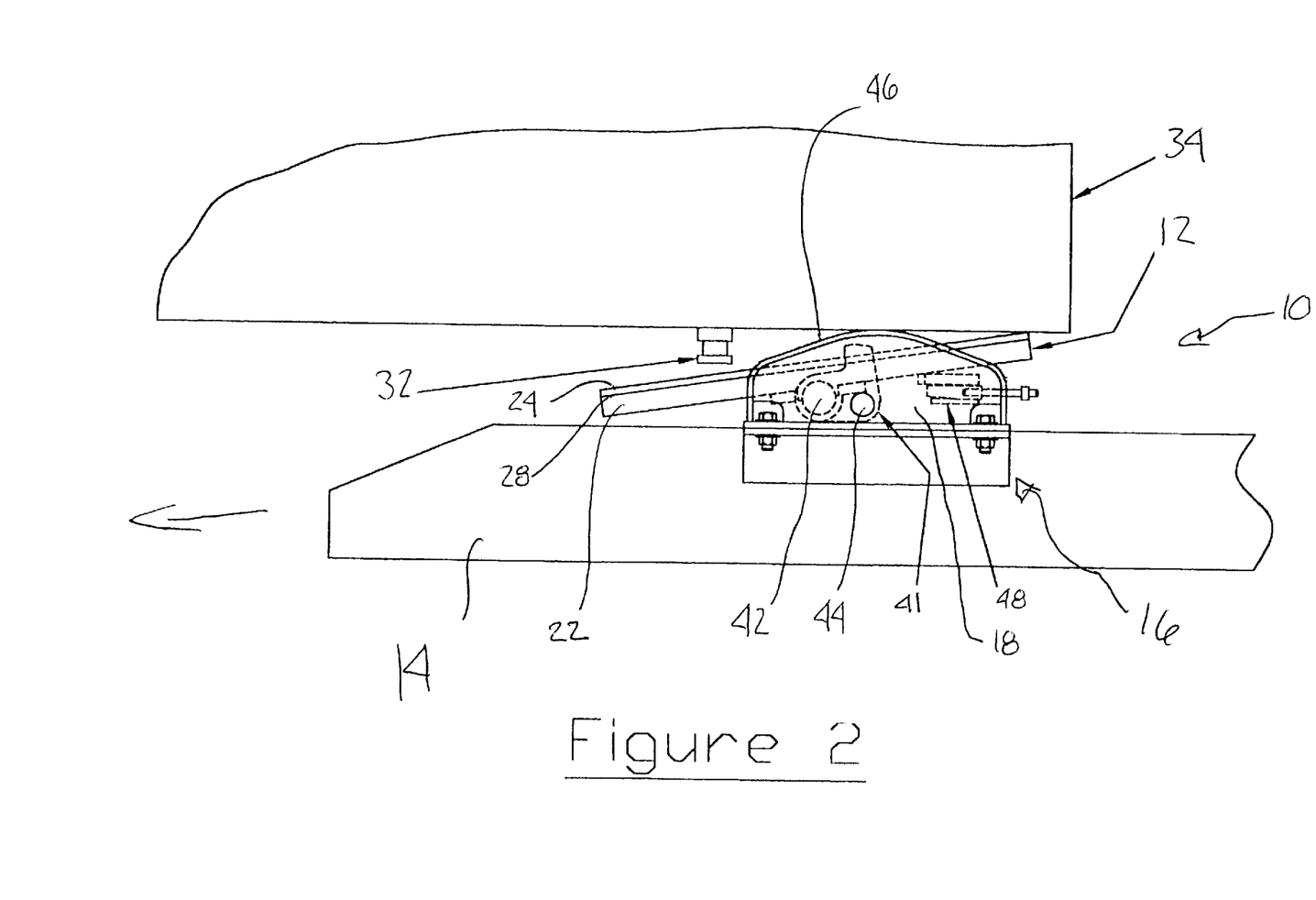
FIG. 2 is a schematic side elevation view of the fifth wheel coupling device illustrated in a lowered inclined position for allowing the coupling operation of a kingpin carried by a trailer to the fifth wheel and allowing the pin to be withdrawn from the fifth wheel.
Figure 3:
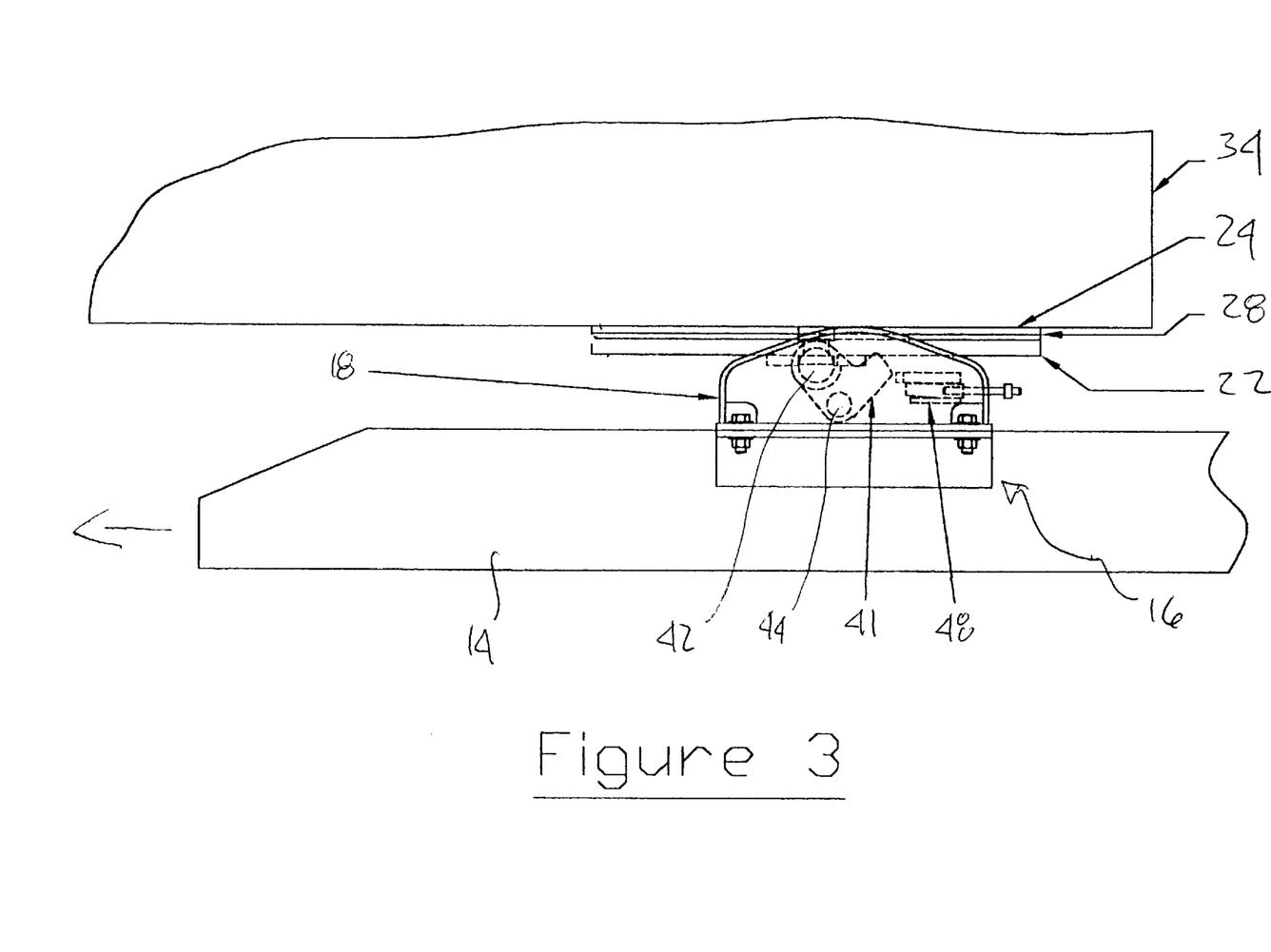
FIG. 3 is a schematic side elevation view of the fifth wheel coupling device illustrated in the process of being pivoted from the lowered inclined position of FIG. 2 to a raised operational position.

As shown in FIGS. 2 to 4, the fifth wheel plate 12 is pivotally mounted between the mounting members 18 by means of a pair of L-shaped links 41 or rocker arms pivoted at 42 to opposed diametrical sides of the base plate 22 and at 44 to associated ones of the mounting members 18. Such a mounting allows the fifth wheel plate 12 to be rocked from a lowered position (FIG. 2) to a raised position (FIG. 4) under the action of the kingpin 32 when the tractor is backed up under the forward end of the trailer 34. The fifth wheel, plate 12 can be locked in its raised position by means of a suitable locking mechanism 48 (FIGS. 3 and 4) engageable with the L-shaped links 41.

As can be appreciated from FIGS. 2 and 3, the mounting members 18 are provided with respective top surfaces defining a ramp 46 for supporting the trailer 34 during coupling and uncoupling operations. The ramps 46 along with the movement capability of the fifth wheel plate 12 enable engagement and disengagement of the kingpin 32 with the closed ended opening 30.

As shown in FIG. 2, when it is desired to couple the tractor to the trailer 34, the tractor is moved backwards towards the trailer 34 with the fifth wheel plate 12 in its lowered position so as to extend rearwardly downwardly at an appropriate angle. The ramp 46 engages the underside of the forward end of the trailer 34 for allowing the kingpin 32 to be guided into the forward end of the fifth wheel opening 30. Once the kingpin 32 has been engaged into the forward end of the opening 30 and the jaws 36 closed thereon, continuous backward movement of the tractor causes the fifth wheel plate 12 to pivot forwardly to an intermediate position (FIG. 3) wherein the top bearing surface 40 is brought against the undersurface of the kingpin plate. Further backward movements of the tractor relative to the trailer 34 causes the fifth wheel plate 12 to be raised above the ramp 46, thereby allowing the top bearing surface 40 of the fifth wheel 12 and the kingpin plate to be the sole bearing contact between the tractor and the trailer 34. The fifth wheel plate 12 is retained in this position by locking the links 41 against pivotal movement with the locking mechanism 48, as shown in FIG. 4. The locking mechanism 48 is preferably manually actuated by the operator. The trailer 34 can be readily uncoupled from the tractor by following the reverse procedure.

The use of the rotatable bearing plate 24 and of the antifriction disc 28 protected from the elements advantageously reduces the friction between the trailer 34 and the tractor, thereby rendering the driving of the tractor easier and also more safety on dry or slippery pavement. The rotatable bearing plate 24 contributes to prevent premature wear of the tires of the tractor and trailer. Furthermore, the rotatable bearing plate 24 eliminates the need of applying grease on the top bearing surface of the fifth wheel plate 12. The environment also benefits from the fifth wheel rotatable bearing plate 24 in that the lubricant stays inside of a watertight compartment, as opposed to conventional fifth wheels where grease is washed by rain or water on the road.

Figure 5:
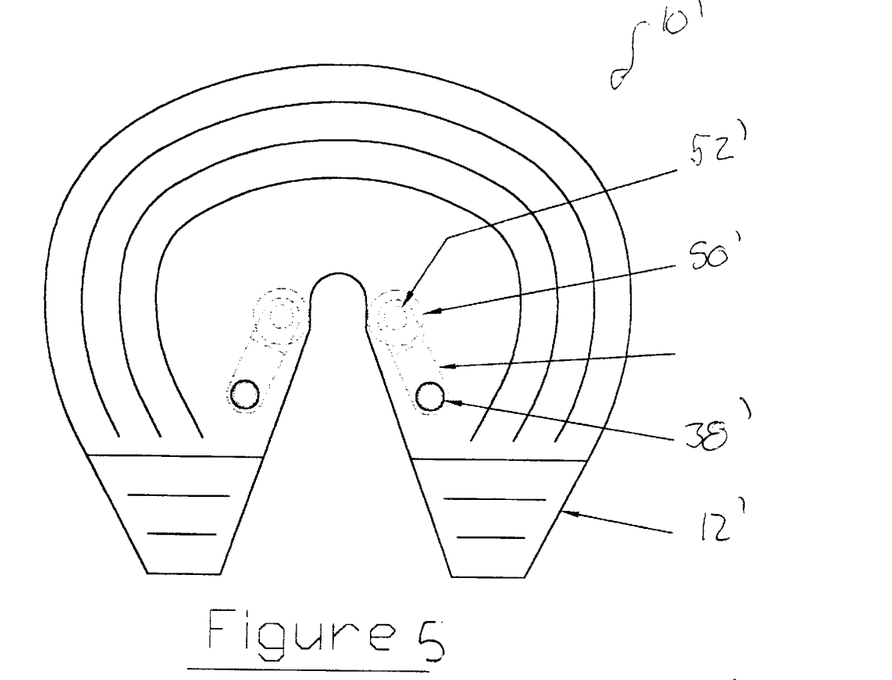
FIG. 5 is a schematic top plan view of a fifth wheel having roller jaws illustrated in an open position thereof in accordance with a second embodiment of the present invention.
Figure 6:
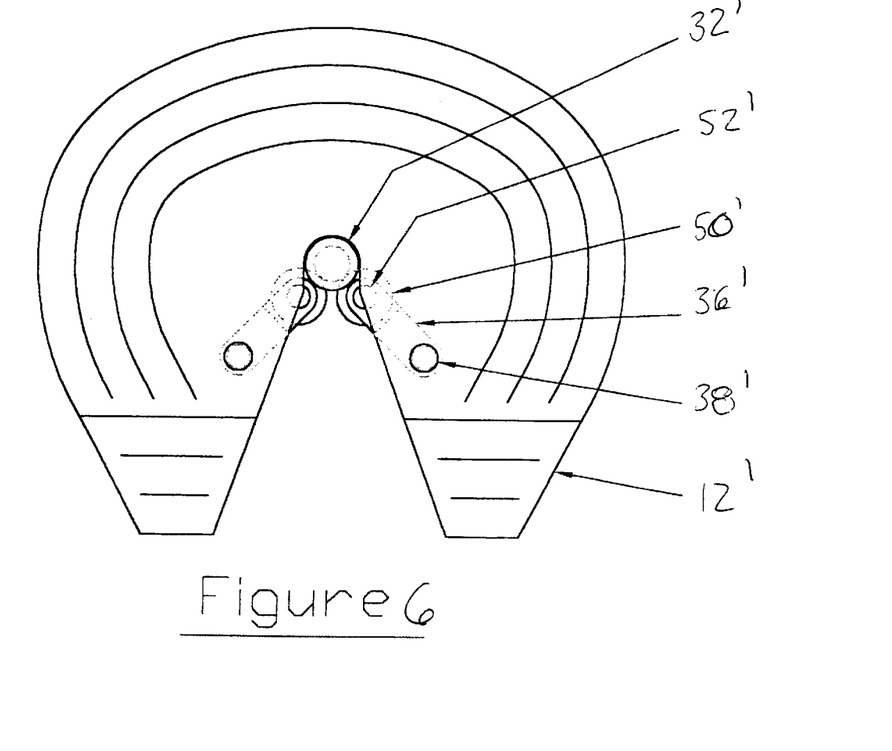
FIG. 6 is a schematic top plan view of the fifth wheel of FIG. 5 with the roller jaws illustrated in a closed position thereof.
Figure 7:
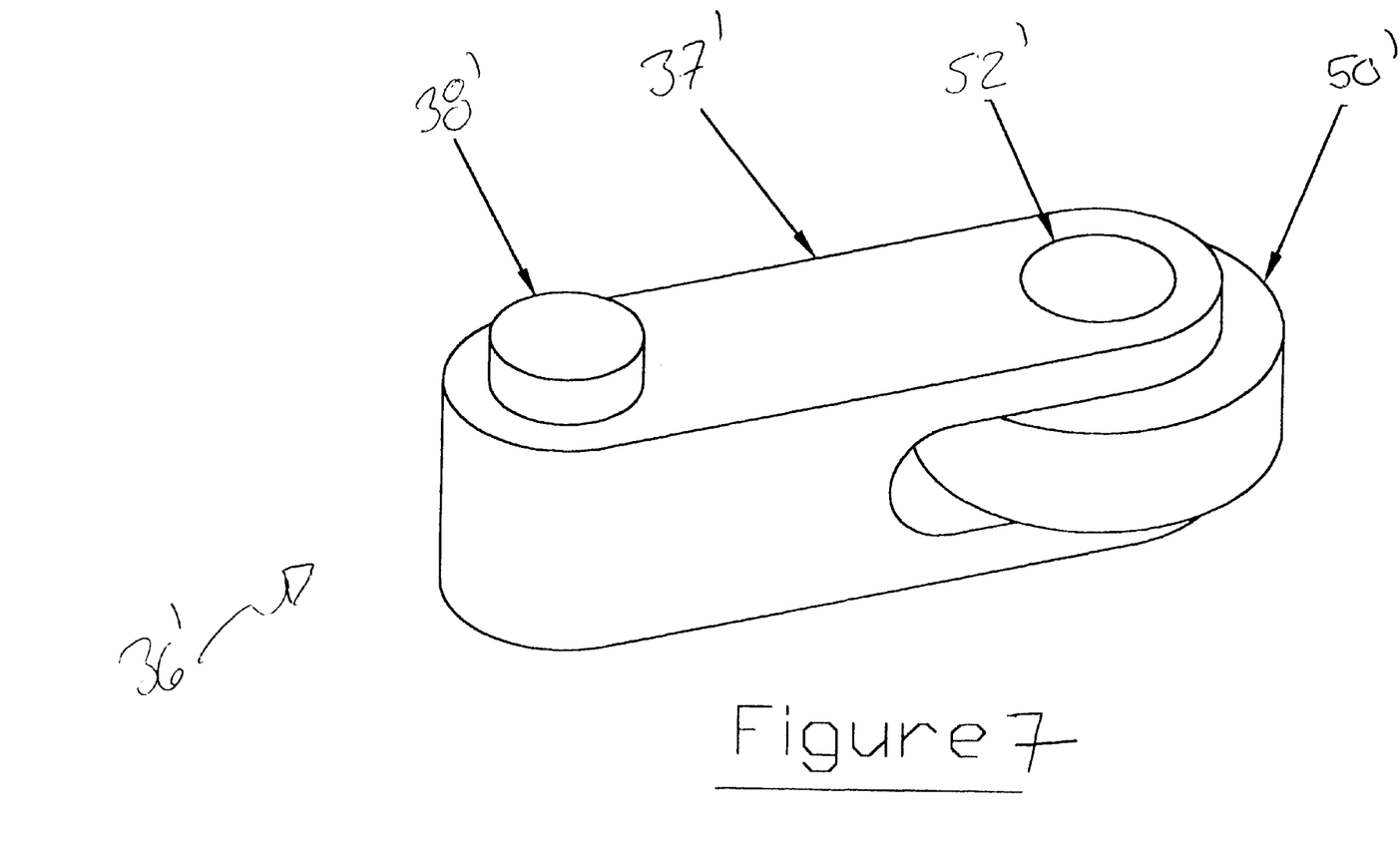
FIG. 7 is a schematic perspective view of a roller jaw.

FIGS. 5 and 6 illustrate a conventional fifth wheel 10' comprising a fifth wheel plate 12' equipped with a set of jaws 36' embodying elements of the present invention. The jaws 36' are pivotally mounted to the underside of the fifth wheel plate 12' via the pivot pins 38' for movement between open and closed positions. As shown in FIG. 7, each jaw 36' includes an elongated jaw member 37' carrying a roller 50' mounted for rotation on an axle 52' extending in parallel to the pivot pin 38' at a distal end of the jaw member 37'.

As can be appreciated from FIG. 6, in use, the rollers 50' will engage the kingpin 32' to retain the same in the fifth wheel opening 30'. This advantageously reduces the friction between the jaws 36' and the kingpin 32' and eliminates the need of greasing the jaws 36'.

It is understood that the above described jaws 36' could be used with the embodiment of FIGS. 1 to 4.

In use, the movements between the kingpin 32' and the jaws 36' are transmitted to the rollers 50', thereby avoiding deterioration of the jaws 36' due to friction contact with the kingpin 32'. This is advantageous in that it prevents premature wear of the kingpin 32' and jaws 36'. Finally, reducing the friction between the kingpin 32' and the jaws 36' also contributes to improve driving on slippery roadway.

What is claimed is:

1. A fifth wheel adapted to be mounted on a tractor for releasable engagement with a kingpin carried by a trailer, comprising a mounting structure adapted to be securely mounted to the tractor, a fifth wheel plate mounted to said mounting structure and having a catch adapted to releasably engage the kingpin, said fifth wheel plate having a top bearing surface adapted to support a bottom bearing surface of the trailer when the kingpin is captively engaged with said catch, wherein said top bearing surface is rotatable with respect to said mounting structure for movement about an axis normal to said top bearing surface in response to an action exerted thereon by the bottom bearing surface of the trailer when the tractor turns relative to the trailer, and wherein said mounting structure includes a ramp adapted to provide support for the trailer while the same is being coupled to or uncoupled from the tractor, said fifth wheel plate being swingable between a lowered position wherein said top bearing surface is substantially at a lower elevation than said ramp and extends rearwardly downwardly at a given angle for allowing the kingpin to be engaged with or disengaged from said catch, and a raised position wherein said top bearing surface is located at a higher elevation than said ramp to support the trailer once the same has been coupled to the tractor, said ramp allowing said fifth wheel plate to be lifted as well as being pivoted forwardly under the action of the kingpin while the tractor is being moved backward towards the trailer.

2. A fifth wheel as defined in claim 1, wherein said fifth wheel plate includes a base plate and an uninterrupted annular bearing plate rotatably mounted in opposing relationship on said base plate, said top bearing surface forming part of said bearing plate, and wherein said catch is encircled by said bearing plate.

3. A fifth wheel as defined in claim 2, wherein an antifriction surface is provided between said base plate and said bearing plate.

4. A fifth wheel as defined in claim 3, wherein said antifriction surface forms part of a slip member secured to a bottom surface of said bearing plate.

5. A fifth wheel as defined in claim 4, wherein said slip member is removable from said bearing plate.

6. A fifth wheel as defined in claim 2, wherein said fifth wheel plate further includes a retaining ring removably secured to said base plate, said bearing plate being seated on said base plate about said retaining ring, said retaining ring having a radially outwardly extending flange for maintaining said bearing plate on said base plate while allowing relative movement therebetween.

7. A fifth wheel as defined in claim 1, wherein said mounting structure includes a pair of laterally spaced-apart mounting members mounted on opposed sides of said fifth wheel plate and defining said ramp.

8. A fifth wheel as defined in claim 7, further including first and second links on opposed lateral sides of said fifth wheel plate, said first and second links being pivotally connected to said fifth wheel plate for rotation about a first axis and to respective ones of said mounting members for rotation about a second axis.

9. A fifth wheel as defined in claim 8, further including a locking mechanism for releasably locking said first and second links against movement once said fifth wheel plate has been displaced to said raised position thereof.

10. A fifth wheel as defined in claim 1, wherein said fifth wheel plate and said catch are configured for allowing the kingpin to become engaged with said catch, when said fifth wheel plate assumes said lowered position thereof, by moving the tractor rearwardly towards the trailer, and wherein said fifth wheel plate is pivotally mounted to a rocker which is in turn pivotally mounted to said mounting structure so as to cause said fifth wheel plate to be initially pivoted forwardly, under the action of the kingpin while the tractor is displaced rearwardly relative to the trailer, to an intermediate position with said ramp providing support for the trailer and then displaced horizontally upwardly from said intermediate position to said raised position thereof in order to support the tractor above said ramp.

11. A fifth wheel as defined in claim 1, wherein said catch includes a set of jaws displaceable between open and closed positions, each said jaw being provided with a roller adapted to engage the kingpin so as to reduce the friction between the jaws and the kingpin when the trailer is coupled to the tractor.

12. A fifth wheel adapted to be mounted on a tractor for releasable engagement with a kingpin carried by a trailer, comprising a fifth wheel plate having a continuous annular top bearing surface and defining a fifth wheel opening encircled by said top bearing surface and adapted to captively receive the kingpin, and a ramp adapted to support a forward end of the trailer during coupling and uncoupling operations, wherein said fifth wheel plate is movable relative to said ramp between a lowered position in which said top bearing surface is located at a substantially lower elevation than said ramp so that the trailer be supported by said ramp and a raised position in which said top bearing surface is located at a higher elevation than said ramp to support the trailer when the kingpin is retained captive in the fifth wheel opening.

13. A fifth wheel as defined in claim 12, further comprises a mounting structure including a pair of laterally spaced-apart mounting members adapted to be securely mounted to the tractor for mounting said fifth wheel plate thereto, wherein said fifth wheel plate is mounted between said pair of laterally spaced-apart mounting members by means of a pair of links pivoted to opposed sides of said fifth wheel plate for rotation about a first axis and to respective ones of said mounting members for rotation about a second axis.

14. A fifth wheel as defined in claim 13, wherein said ramp is formed by respective top surfaces of said mounting members.

15. A fifth wheel as defined in claim 13, wherein said fifth wheel plate and said fifth wheel opening are configured for allowing the kingpin to become engaged in said fifth wheel opening, when said fifth wheel plate assumes said lowered position thereof, by moving the tractor rearwardly towards the trailer, and wherein said fifth wheel plate is so pivotally mounted to said mounting structure to cause said fifth wheel plate to be initially pivoted forwardly, under the action of the kingpin while the tractor is displaced rearwardly relative to the trailer, to an intermediate position with said ramp providing support for the trailer and then displaced horizontally upwardly from said intermediate position to said raised position thereof in order to support said trailer above said ramp.

16. A fifth wheel as defined in claim 12, wherein said top bearing surface is rotatable about an axis normal thereto.

17. A fifth wheel as defined in claim 16, wherein said fifth wheel includes a base plate and a bearing plate seated on the base plate for rotational movement with respect thereto, said top bearing surface forming part of said bearing plate.

18. A fifth wheel as defined in claim 17, wherein said fifth wheel opening is defined in said base plate, and wherein said top bearing surface extends continuously circumferentially about said fifth wheel opening.

19. A fifth wheel as defined in claim 18, wherein a retaining ring is removably secured to said base plate for retaining said bearing plate thereon while allowing relative movement therebetween.

20. A fifth wheel as defined in claim 12, further including a set of jaws adapted to releasably retain the kingpin within said fifth wheel opening, each said jaw being provided with a roller adapted to engage the kingpin so as to minimize the friction between the jaws and the kingpin when the trailer is coupled to the tractor.

21. A fifth wheel for coupling a tractor to a trailer carrying a kingpin, comprising a mounting structure adapted to be mounted to the tractor, a fifth wheel plate mounted to said mounting structure and having a continuous annular top bearing surface rotatable relative to said mounting structure about an axis normal to said top bearing surface.

* * * * *